Nov. 24, 1970     C. B. TURNER     3,543,099
PHOTOELECTRIC CONTROL DEVICE
Filed April 23, 1968
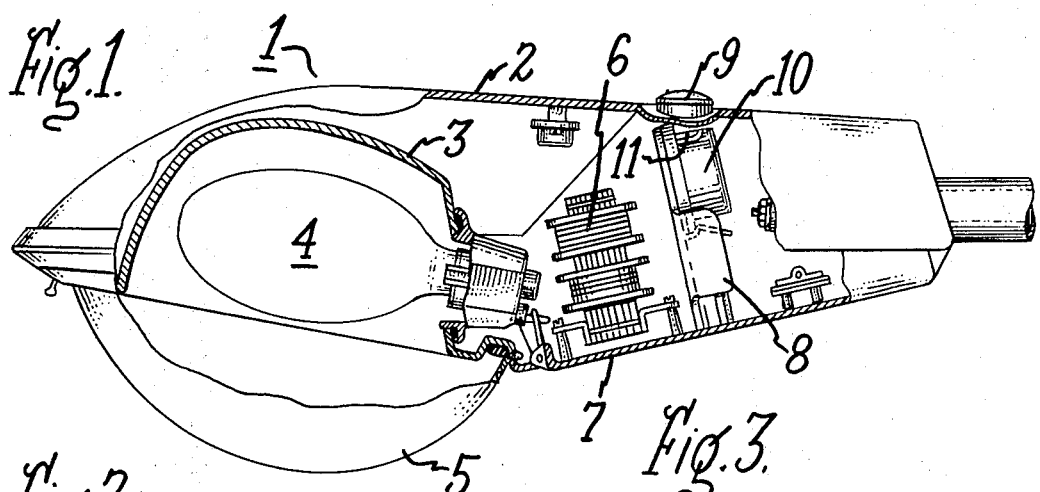
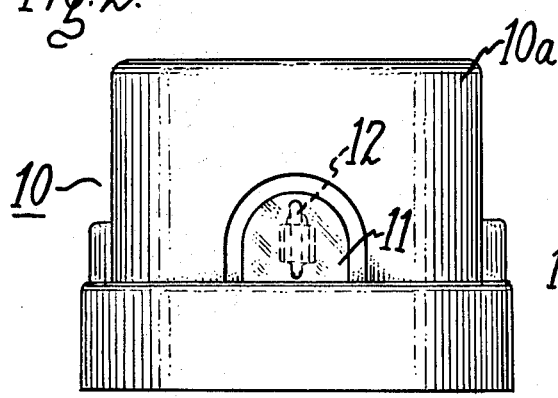
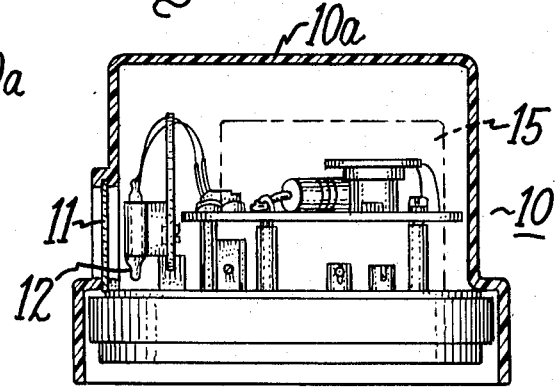
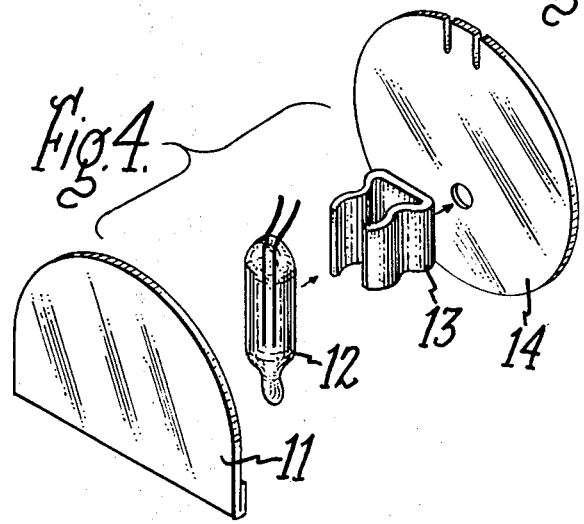
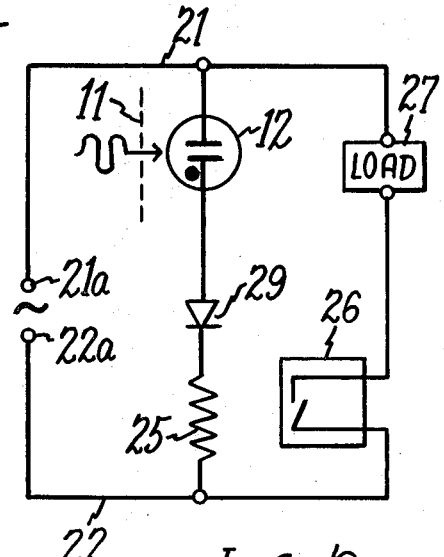
Inventor,
Charlie B. Turner,
by Sidney Greenberg
His Attorney.

United States Patent Office 3,543,099
Patented Nov. 24, 1970

3,543,099
PHOTOELECTRIC CONTROL DEVICE
Charlie B. Turner, Hendersonville, N.C., assignor to General Electric Company, a corporation of New York
Filed Apr. 23, 1968, Ser. No. 723,532
Int. Cl. H01h 47/24
U.S. Cl. 317—124                                    5 Claims

ABSTRACT OF THE DISCLOSURE

Photoelectric control device for switching loads such as street lights on and off comprises the combination of a photo-sensitive gaseous discharge tube for sensing radiant energy of predetermined wavelength, switch means for operating the load in response to actuation of the gaseous discharge tube by said radiation, and a thermally stable optical filter composed of a copolymer of tetrafluoroethylene and hexafluoropropylene interposed between the gaseous discharge tube and the source of said radiant energy.

---

The present invention relates to photoelectric control devices, and more particularly to such devices having a photo-sensitive gaseous discharge tube which is actuated by selected wavelengths of radiant energy for controlling the operation of loads such as street lighting luminaires.

It is an object of the invention to provide photoelectric control devices of the above type having an optical filter for effectively transmitting the selected radiant energy to the photo-sensitive element thereof over a prolonged period even when subjected to severe, widely varing ambient conditions.

It is a particular object of the invention to provide an improved photoelectric control device of the above type in combination with a street lighting luminaire having electrical heat-generating operating components, including the photoelectrc control device, compactly mounted within the luminaire housing.

Other objects and advantages will become apparent from the following description and the appended claims.

With the above objects in view, the present invention relates to a photoelectric control device for controlling the operation of a load comprising, in combination, a photo-sensitive gaseous discharge tube having a predetermined breakdown voltage and becoming conductive at the breakdown voltage by incidence thereon of radiant energy of wavelengths in the range of about .3–.4 micron, and an optical filter interposed between the gaseous discharge tube and a source of the radiant energy, the filter comprising a transparent fluorocarbon material transmitting radiant energy in the aforementioned wavelength range.

The invention will be better understood from the following description taken in conjunction with the accompanying drawing, in which:

FIG. 1 is an elevational view, partly broken away, of a street lighting luminaire in which the invention may be embodied;

FIG. 2 is a front elevational view of the photoelectric control unit contained in the FIG. 1 luminaire;

FIG. 3 is a sectional side view of the FIG. 2 photoelectric control unit showing the interior components ncluding the photo-sensitive element;

FIG. 4 is an enlarged exploded view of the photo-sensitive element, its mounting means and the optical filter associated therewith; and FIG. 5 is a circuit diagram showing the control circuit of the photoelectric unit.

Referring now to the drawing, and particularly to FIG. 1, there is shown a street lighting luminaire 1 in which the invention may be embodied and comprising an upper housing 2 containing a reflector 3 and lamp 4, a transparent closure or refractor 5 covering the mouth of the reflector, and electrical operating components such as ballast transformer 6, it being understood that other operating components not shown (such as capacitors, terminal board, conductors, etc.) are also located within housing 2 in operative association with lamp 4 and transformer 6. Bottom panel 7 hinged at its rear end on housing 2 and detachably secured at its front end to an intermediate portion of housing 2 closes the rear bottom portion of the latter. Also located in the rear compartment of housing 2 is photoelectric control unit 10 mounted on a suitable support 8 with its light transmitting window 11 facing upwardly toward a transparent dome 9 in the top of luminaire housing 2, whereby exterior light may enter through dome 9 and pass through window 11 of the photoelectric control unit 10 to impinge on the photosensitive element 12 contained therein. As understood by those versed in the outdoor luminaire art, photoelectric control unit 10 serves to turn lamp 4 on during the hours of darkness and turn it off during daylight hours.

Photoelectric control unit 10 used in practicing the present invention is of a type utilizing a gaseous discharge tube which is sensitive to radiant energy of a certain range of wavelengths. As seen in FIGS. 3 and 4, such a photo-sensitive tube 12 is suitably mounted in the interior of casing 10a adjacent the inner side of window 11 which is constituted by an optical filter made of a material having advantageous properties and functions as more fully disclosed hereinafter. As seen more clearly in the exploded view of FIG. 4, photo-sensitive gas tube 12 is detachably mounted by resilient bracket 13 on diskshaped support member 14 made of a suitable electrically insulating material such as a plastic, the latter member being suitably mounted on a fixed support in the photocontrol unit. Photo-sensitive tube 12 in the embodiment shown is associated with a control circuit 15 (shown enclosed in interrupted lines in FIG. 3) for turning lamp 4 on and off in a controlled manner. Such a circuit and the components thereof are disclosed in detail in co-pending application Ser. No. 633,981—Nuckolls et al., filed Apr. 26, 1967, now Pat. 3,483,430 issued Dec. 9, 1969, and assigned to the same assignee as the present application, and the disclosure of the co-pending application is accordingly incorporated by reference herein.

As there disclosed, gas tube 12 is of a type which responds to radiant energy of some form and in the application of the device for turning the street lighting luminaire on and off at desired light levels, gas tube 12 is sensitive to wavelengths of ambient light, such as those of visible or ultraviolet light. Such photo-sensitive gas tubes typically comprise a glass envelope containing an ionizable gas such as neon and a pair of spaced electrodes. The gas tube has a characteristic voltage breakdown level, and when that level is reached and selected radiation is incident on the gas tube to cause photoemission of electrons from the cathodes, the gas becomes ionized, resulting in conduction of current through the tube. In order to ensure that the gas tube is de-ionized at intervals so that it can recover to a condition in which it is capable of detecting subsequent photoemitting or photoionizing radiations, means are provided for interrupting the current through the tube. Various current interrupting means for this purpose are disclosed in the aforementioned co-pending application, and one form of such means is shown in the circuit depicted in FIG. 5 herein.

As shown in FIG. 5, the photoelectric control arrangement is connected to supply lines 21, 22 having terminals 21a, 22a for connection to a suitable power supply. Gas tube 12 is connected across the power supply in series with diode 29, serving as the above-described current interrupter, and heating resistor 25. Arranged adjacent to the latter is thermal switch 26 connected in series with load 27, such as a street lighting luminaire. In operation, when radiation is detected by gas tube 12, current flows to heating resistor 25 through diode 29 and eventually sufficient heat will be generated by resistor 25 to actuate thermal switch 26, thus energizing load 27. Thermal switch 26 thus has an integrating effect on the circuit, which avoids sporadic operation of the load such as would be caused by normal fluctuations of the light intensity at the low lighting levels at dusk and dawn. Once thermal switch 26 has closed or opened, its thermal lag or differential is adequate to hold it in that position until a substantial variation in temperature occurs to change its position. In the use of the described device for operating street lighting luminaires, the contacts of thermal switch 26 would normally be closed during the hours of darkness when gas tube 12 would not be actuated by light rays, and the contacts would be open during the daytime due to the effect of heat thereon produced by integrating resistor 25 which results from conduction by gas tube 12 when daytime light rays are incident thereon.

The light sensitive gaseous discharge tube 12 used in practicing the invention typically comprises nickel electrodes, a Penning gas mixture of neon and about .1–1% by volume of argon at a pressure of 50–80 torr, and a lead glass envelope. The electrodes may be made of metals other than nickel, such as molybdenum, tungsten or any electrode metal which has an effective work function greater than 3.5 electron volts.

Gas tubes of the above nature are sensitive to light rays in the range of .3–.4 micron and become conductive when exposed thereto. In order to ensure that gas tube 12 and the described photoelectric control device will operate properly over a long period of time even when used in severe environmental conditions, there is provided in accordance with the invention a novel light transmitting window 11 through which gas tube 12 is exposed to ambient light rays, window 11 being composed of the copolymer of tetrafluoroethylene and hexafluoropropylene, which forms fluorinated ethylene propylene and is hereinafter referred to as FEP for brevity.

By virtue of its FEP composition, window 11 provides a number of marked advantages in its combination with gas tube 12 in the described luminaire photocontrol arrangement. The FEP window, which typically is about 20 mils thick, will transmit a very large percentage of that portion of the ultraviolet spectral range, i.e., .3 to .4 micron, to which gas tube 12 is sensitive, and in this regard the FEP is better than ordinary window glass which transmits much less of the ultraviolet band. It has further been found that the FEP will retain such transmission characteristics even after prolonged periods of exposure to atmospheric conditions, a property which is in marked contrast to other types of plastic materials such as polycarbonates, acrylic resins and other compositions heretofore used or suggested for the described purposes. The FEP is particularly advantageous in its thermal stability characteristics, since it retains its initially desirable physical and transmission properties even when subjected to elevated temperature conditions, and in this regard also affords considerable improvement over previously used plastic window materials. Such severe temperature conditions prevail in the luminaire housing compartment in which photoelectric control unit 10 is located, as shown in FIG. 1, as a result of the aggregate heat generated by lamp 4, transformer 6, and other electrical operating components therein. With the trend toward even more compact luminaire units and the consequent close crowding of heat-evolving operating components therein, the thermal stability of optical filter 11 becomes of even greater importance in the proper operation of such apparatus.

In general, the FEP material is characterized by high softening point, excellent electrical resistance, inertness to weathering effects over a wide range of temperatures, low moisture absorption and permeability, high mechanical strength, and outstanding thermal stability. These properties, coupled with the desirable radiant energy transmission properties mentioned previously, make the FEP window member practicularly advantageous for use in the described luminaire apparatus.

When photoelectric control unit 10 is disposed in the interior of the luminaire as shown in FIG. 1 with light impinging thereon through transparent dome 9, the latter will also of course usually be made of the described FEP material in order to obtain full benefit of the transmission characteristics of the FEP window 11. It will be understood, however, that photoelectric control unit 10 may, if desired, be mounted on the outside of housing 2 in a conventional manner, or in other suitable locations. Because of the abovementioned combination of desirable properties of FEP, the entire housing 10a of control unit 10 may, if desired, be made of transparent FEP, so that the housing serves the double function of an enclosure for the photocontrol components and an optical filter for gas tube 12. As such, housing 10a would be much less subject to the risk of softening under the elevated temperatures of the luminaire interior, with the consequent possibility of interference with the operation of the enclosed photocontrol components, than would be the case in the use of conventional types of plastic housing materials.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Photoeletcric control device for controlling the operation of a load comprising, in combination, a photosensitive gaseous discharge tube having a predetermined breakdown voltage and becoming conductive at said breakdown voltage by incidence thereon of radiant energy of wavelengths in the range of about .3–.4 micron, and an optical filter interposed between said gaseous discharge tube and a source of said radiant energy, said filter comprising a transparent fluorocarbon material transmitting radiant energy in said wavelength range and being composed of a copolymer of tetrafluoroethylene and hexafluoropropylene.

2. A device as defined in claim 1, including a control circuit operatively associated with said gaseous discharge tube and responsive to the operation thereof for turning a load on and off, said control circuit including a heating resistor and a thermal switch responsive to the operation of said heating resistor.

3. A device as defined in claim 1, said photo-sensitive gaseous discharge tube being contained in an opaque housing having an opening in a wall thereof facing said gaseous discharge tube, said optical filter closing said opening in said housing.

4. A luminaire comprising, in combination, a housing, heat-producing electrical components including a light source and operating devices therefor located within said housing, said housing containing therein a photoelectric control device as defined in claim 1, said photoelectric control device being exposed to the heat generated by said electrical components therein.

5. A luminaire as defined in claim 4, said housing having an opening therein closed by a transparent window composed of a copolymer of tetrafluoroethylene and hexafluoropropylene, said photoelectric control device being arranged in said housing with said optical filter facing said opening therein.

References Cited

UNITED STATES PATENTS

| | | | |
|---|---|---|---|
| 2,238,605 | 4/1941 | Schade | 313—100 |
| 2,238,620 | 4/1941 | Blackburn | 313—100 |
| 3,062,793 | 11/1962 | Eleuterio. | |
| 3,093,744 | 6/1963 | Tabet | 317—124 X |
| 3,157,812 | 11/1964 | Friedman et al. | 350—1 X |
| 3,432,728 | 3/1969 | Kawase | 317—124 |

J D MILLER, Primary Examiner

W. J. SMITH, Assistant Examiner

U.S. Cl. X.R.

250—83.3, 86, 226; 313—100, 158; 350—311